United States Patent Office 3,324,192
Patented June 6, 1967

3,324,192
PROCESS FOR THE PREPARATION OF TERTIARY ALKYL AROMATIC HYDROCARBONS
Alan K. Roebuck, Schererville, Ind., and Bernard L. Evering, Chicago, Ill., assignors to Standard Oil Company, Chicago, Ill., a corporation of Indiana
No Drawing. Filed Jan. 24, 1964, Ser. No. 339,871
13 Claims. (Cl. 260—671)

This invention relates to the alkylation of aromatics, and particularly relates to the preparation of tertiary alkyl-substituted mono-nuclear aromatic ring compounds using double salts of an aluminum halide and an alkali metal halide as the catalyst.

It has been known for some time to use Friedel-Crafts type catalysts to alkylate aromatics. When a mono-alkyl aromatic compound is alkylated with a tertiary alkylating agent, the catalyst system has a strong effect on whether the alkylation will occur primarily at the meta- or the para-position. When alkylating aromatics using active Friedel-Crafts catalysts, usch as $AlCl_3$ or $AlBr_3$, the reaction product is predominantly the meta isomer; see M. J. Schlotter and R. D. Clark's note titled, "Orientation of t-Alkylation Products of Toluene and Ethylbenzene," Journal of the American Chemical Society, 75, 361 (1953); C. C. Price's Chapter 1 in "Organic Reactions," volume 3 (1946), at pages 8–9; and C. A. Thomas' "Anhydrous Aluminum Chloride in Organic Chemistry," particularly Chapters 3 and 5. Such is also generally true when using a double salt of an aluminum halide and a metallic halide as the catalyst system.

However, we have now discovered that an aluminum halide double salt which includes a sodium or potassium halide preferentially directs to the para-position the alkylation of a mono-nuclear aromatic ring with a teritary alkylating agent.

The aromatic compounds suitable for alkylation in our process are those having a mono-nuclear aromatic ring having an open (that is, a non-subsituted) para-position. Such aromatics include benzene, toluene, ethylbenzene, cumene, t-butyl benzene and the like. When benzene is used as a feedstock in this process, most of the reaction product is the mono-tertiary alkyl benzene, with a minority being the di-tertiary alkyl benzenes, but of the latter, the para isomer predominates. To increase the yield of the di-alkylated product, the mono-alkylated product may be separated and again alkylated. With the mono-substituted benzenes, as referred to above, a single tertiary alkylation takes place, and this at the para-position. Complex aromatic compounds possessing at least one mono-nuclear aromatic ring, such as phenyl naphthalene, diphenyl and ortho methyl diphenyl may also be alkylated by the process to obtain preferentially alkylation at the para-position or, as in the case of diphenyl, both para-positions of the mono-nuclear ring.

When alkylating phenyl naphthalenes in this process, considerable alkylation also occurs at the 6 and 7, and in the case of alpha phenyl naphthalene, at the 3 position of the naphthyl group, as well as at the para-position of the phenyl group.

The tertiary alkylating agents suitable for use in the process are the iso-olefins and tertiary-alkyl halides. These compounds may have from 4 to about 12 to 16 carbon atoms per molecule, with the larger molecules being of particular use in preparing detergents or lubricity compounds. As the number of carbon atoms in the tertiary alkylating agent increases, the tertiary character of the agent decreases; hence, the preferred tertiary alkylating agents have from 4 to 8 carbon atoms per molecule. When a tertiary alkyl halide is used, the halide atom is preferably the same as the halide used in the catalyst system described hereinafter. When alkylating with iso-olefins, the iso-olefin stream may be mixed with normal olefins without reducing significantly the purity of the alkylation product, inasmuch as normal olefins do not alkylate in the process as described herein. It is not necessary that the iso-olefin used as an alkylating agent be a teritary olefin, because a non-tertiary iso-olefin will be converted by the catalyst system to a tertiary carbonium ion.

The catalysts used in the process are aluminum halide double salts of sodium or potassium halides. A preferred catalyst is an equimolar complex of NaCl and $AlCl_3$. Complex salts comprising from about one-fourth to one-half mol of sodium, and from about three-fourths to one-half mol of potassium, per mol of aluminum are also effective to preferentially direct tertiary alkylating agents to an open para-position on a mono-nuclear aromatic ring. Very surprisingly, aluminum halide-lithium halides which do not include sodium or potassium, are substantially ineffective for the purpose. The double salts preferably comprise a single halide, either chlorides, bromides or iodides.

The alkali metal halide double salts of an aluminum halide are well known, and methods of their preparation are disclosed in, for example, Dr. C. A. Thomas' book, particularly at page 42; in F. H. Blunck and D. R. Carmody's paper "Catalytic Alkylation of Isobutane With Gaseous Olefins," Industrial & Engineering Chemistry, volume 32, page 328 (March 1940); and Pardee et al. U.S. Patent No. 2,388,007. Inasmuch as the double salts are hydroscopic, care should be taken to exclude water and moist air from the salts during their preparation and use. The double salts are not significantly soluble in aromatics, and perform their function as catalysts in the form of finely divided solid, pellets, or disposed on an anhydrous support, such as calcined alumina or silica.

In conducting the process, it is desirable to have at least one part by weight of double salt per 100 weights of aromatic feedstock. Considerably greater amounts of catalyst, up to about a weight ratio of about 1:15, may be used. At least one mol of aromatic compound per mol of alkylating agent is necessary, and it is preferable to maintain in the reaction zone a higher ratio, on the order of about 10:1. The alkylation may be conducted under known alkylating conditions, in the range of about 40 to about 170° F., advantageously at temperatures in the range of 70–125° F., and a pressure sufficient to maintain a liquid system, but not so great as to prevent the release from the liquid phase of the HCl formed as a by-product of the alkylation. The residence time in the reaction zone should be correlated with the reaction temperature, with shorter residence times being used with the higher temperatures. In batch operations, a suitable criterion for the completion of the reaction is the cessation of the evolution of HCl.

Specific embodiments of the process are disclosed in the following examples in which toluene was alkylated using various double salts. The catalysts were prepared by heating the desired mol ratios of the salts (e.g., equal mol ratios of NaCl and $AlCl_3$; or one-half mol each of KCl and NaCl per mol of $AlCl_3$) in glass flasks to temperatures in the range of 200–400° C. The resulting molten mass was poured into evaporating dishes to cool and solidify. The solid double salt was then ground to a fine powder in a ball mill.

The aromatic feedstocks were dried over sodium ribbon before use. The tertiary alkylating agents were used as received from the supplier. Gas chromatography was used in analyzing the reaction products.

The results of these examples are reported in the following table. Except as noted hereinafter, each run was conducted using 430 grams of toluene, and 40 grams of tertiary butyl chloride. The exceptions are run No. 2, which used 40 grams of toluene dissolved in 400 ml. of n-heptane as a solvent; run No. 11, which used 45 grams of tertiary amyl chloride, and run No. 12, which used 30 grams of 2-methyl butene-2. Also, the reaction mixture of run No. 12 was blanketed with HCl to a pressure of 3 p.s.i.g. Other runs were done at atmospheric pressure.

TABLE

| Run No. | 1 | 2 | 3 | 4 | 5 | 6 | 7 | 8 | 9 | 10 | 11 | 12 |
|---|---|---|---|---|---|---|---|---|---|---|---|---|
| Catalyst | NaAlCl$_4$ | NaAlCl$_4$ | KAlCl$_4$ | LiAlCl$_4$ | CuAlCl$_4$ | (1) | (2) | NaAlCl$_4$ | NaAlCl$_4$ | NaAlCl$_4$ | NaAlCl$_4$ | NaAlCl$_4$ |
| Catalyst, grams | 25 | 10 | 10 | 25 | 25 | 25 | 10 | 25 | 1 | 5 | 25 | 25 |
| Temperature, °F | 110 | 110 | 160 | 90 | 60 | 110 | 110 | 90 | 150 | 110 | 110 | 110 |
| Time, hours | 1.0 | 2.5 | 1.0 | 1.0 | 1.0 | 0.5 | 1.0 | 1.0 | 2.0 | 1.0 | 1.0 | 0.75 |
| Products: | | | | | | | | | | | | |
| Alkylate, grams | 62 | 19 | 11 | 60 | 64 | 61 | 62 | 61 | Nil | 61 | 66 | 64 |
| Alkylate, percent | 96 | 29 | 17 | 93 | 98 | 95 | 97 | 94 | | 94 | 97 | 92 |
| Distribution: | | | | | | | | | | | | |
| Percent Meta | 14 | 35 | 14 | 66 | 56 | 10 | 10 | 12 | | 11 | 14 | 13 |
| Percent Para | 86 | 65 | 86 | 34 | 44 | 90 | 90 | 88 | | 89 | 86 | 86 |

1 ½ mol of NaCl plus ½ mol of KCl plus 1 mol AlCl$_3$.
2 ¼ mol of NaCl plus ¾ mol of KCl plus 1 mol of AlCl$_3$.

Referring to the table, both sodium-aluminum, potassium-aluminum and mixed sodium-potassium-aluminum salts are effective catalysts to direct the tertiary alkylation to the para-position, as shown in Runs 1, 3, 6 and 7. However, lithium - aluminum and cuprous - aluminum halides are relatively ineffective, as shown in Runs 4 and 5 wherein the alkylation product exceeds 90% of theoretical, despite the relatively low temperatures of 90 and 60° F., but the products were primarily the meta isomer. Comparison of Runs 1 and 2 illustrates the advantages of a high (10:1) ratio of aromatic to alkylating agent rather than the minimum of 1:1. Runs 1, 11 and 12 illustrate that the catalyst system is effective when the tertiary alkylating agent is a tertiary alkyl halide, such as tertiary butyl chloride or tertiary amyl chloride, and an iso-olefin, such as 2-methyl butene-2, as in Run 12.

The disclosure of the articles, patents and textbooks referred to above are expressly incorporated by reference into this specification.

Having thus described the invention, what is claimed is:

1. A process of preparing predominantly p-tertiary alkyl mono-nuclear aromatics which comprises contacting under liquid phase alkylation conditions an aromatic compound having a mono-nuclear aromatic ring, said ring having an open para-position, and a tertiary alkylating compound in the presence of a catalyst comprising a 1:1 mole ratio of a double salt of an aluminum halide and an alkali metal halide selected from the alkali metals sodium, potassium and mixtures thereof, said halides being selected from the class consisting of chlorides, bromides and iodides, whereby said mono-nuclear aromatic ring is preferentially alkylated in the para-position.

2. The process of claim 1 wherein said aromatic compound is toluene and the alkylated product is para-tertiary-alkyl toluene.

3. The process of claim 1 wherein said aromatic compound is benzene and the dialkylated product comprises predominantly para-ditertiary-alkyl benzene.

4. The process of claim 1 wherein said aromatic compound comprises a phenyl naphthalene and the alkylation products comprise a para-tertiary-alkyl phenyl teretiary-alkyl-substituted naphthalene.

5. The process of claim 4 wherein said aromatic compound is 1-phenyl 4-methyl naphthalene.

6. The process of claim 1 wherein said alkylating compound comprises tertiary butyl chloride.

7. The process of claim 1 wherein said catalyst comprises a double salt of sodium chloride and aluminum chloride.

8. The process of claim 1 wherein said catalyst comprises sodium bromide and aluminum bromide.

9. The process of claim 1 wherein said catalyst comprises a sodium-potassium-aluminum chloride.

10. The process of claim 1 wherein said alkylating compound comprises isobutylene.

11. The process of claim 1 wherein said alkylating compound comprises an isopentylene.

12. The process of claim 1 wherein said halides are chlorides.

13. The process of claim 1 wherein said halides are bromides.

References Cited
UNITED STATES PATENTS 2,271,299  1/1942  Ipatieff et al. _____ 260—671 X
2,378,733  6/1945  Sensel _____ 260—671 X
2,388,007  10/1945  Pardee et al. _____ 260—671

DELBERT E. GANTZ, *Primary Examiner.*

C. R. DAVIS, *Assistant Examiner.*